US011001906B2

(12) United States Patent
Kawamura et al.

(10) Patent No.: US 11,001,906 B2
(45) Date of Patent: May 11, 2021

(54) HIGH-STRENGTH STEEL SHEET AND PRODUCTION METHOD THEREFOR

(71) Applicant: JFE STEEL CORPORATION, Tokyo (JP)

(72) Inventors: Kenji Kawamura, Fukuyama (JP); Noriaki Kohsaka, Fukuyama (JP); Yasuhiro Nishimura, Kurashiki (JP)

(73) Assignee: JFE STEEL CORPORATION, Tokyo (JP)

( * ) Notice: Subject to any disclaimer, the term of this patent is extended or adjusted under 35 U.S.C. 154(b) by 841 days.

(21) Appl. No.: 15/561,786

(22) PCT Filed: Aug. 20, 2015

(86) PCT No.: PCT/JP2015/004178
§ 371 (c)(1),
(2) Date: Sep. 26, 2017

(87) PCT Pub. No.: WO2016/157257
PCT Pub. Date: Oct. 6, 2016

(65) Prior Publication Data
US 2018/0080100 A1 Mar. 22, 2018

(30) Foreign Application Priority Data
Mar. 27, 2015 (JP) .............................. JP2015-066220

(51) Int. Cl.
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/16* | (2006.01) |
| *C22C 38/26* | (2006.01) |
| *C22C 38/28* | (2006.01) |
| *C23C 2/06* | (2006.01) |
| *C22C 38/60* | (2006.01) |
| *C22C 38/14* | (2006.01) |
| *C22C 38/42* | (2006.01) |
| *C22C 38/22* | (2006.01) |
| *C22C 38/44* | (2006.01) |
| *C22C 38/12* | (2006.01) |

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0247* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/42* (2013.01); *C22C 38/44* (2013.01); *C22C 38/60* (2013.01); *C23C 2/06* (2013.01); *B32B 2311/20* (2013.01); *C21D 2211/002* (2013.01); *C21D 2211/005* (2013.01); *C21D 2211/008* (2013.01)

(58) Field of Classification Search
CPC ....... C21D 8/0205; C21D 8/0247; C21D 9/46
See application file for complete search history.

(56) References Cited

U.S. PATENT DOCUMENTS

| 8,828,557 B2 | 9/2014 | Takagi et al. |
| 10,077,486 B2 | 9/2018 | Takashima et al. |
| 2012/0175028 A1* | 7/2012 | Matsuda ................. C21D 9/46 148/645 |
| 2014/0242415 A1 | 8/2014 | Azuma et al. |
| 2015/0027594 A1* | 1/2015 | Kawamura ............. C22C 38/04 148/507 |
| 2018/0002778 A1* | 1/2018 | Kariya .................. C21D 6/001 |

FOREIGN PATENT DOCUMENTS

| EP | 1486574 A1 | 12/2004 |
| EP | 2937433 A1 | 10/2015 |
| EP | 3009527 A1 | 4/2016 |

(Continued)

OTHER PUBLICATIONS

International Search Report and Written Opinion for International Application No. PCT/JP2015/004178, dated Nov. 17, 2015—4 Pages.

(Continued)

Primary Examiner — Anthony J Zimmer
Assistant Examiner — Jeremy C Jones
(74) Attorney, Agent, or Firm — Ratnerprestia

(57) ABSTRACT

A high-strength steel sheet having a tensile strength of at least 780 MPa and excellent punchability comprises a ferrite phase, a martensite phase, and a bainite phase. The area ratio of the martensite phase is 20%-50%; the area ratio of crystal grains having an average crystal grain diameter of less than 1.0 μm in the martensite phase is 5%-30%; the area ratio of crystal grains having an average crystal grain diameter of 1.0-4.0 μm is 70%-95%; and the area ratio of crystal grains having an average crystal grain diameter of more than 4.0 μm is less than 5%.

8 Claims, No Drawings

(56) References Cited

FOREIGN PATENT DOCUMENTS

| | | |
|---|---|---|
| JP | H06179922 A | 6/1994 |
| JP | 3304191 B2 | 7/2002 |
| JP | 2003342683 A | 12/2003 |
| JP | 2008156734 A | 7/2008 |
| JP | 2010126747 A | 6/2010 |
| JP | 4640130 A | 3/2011 |
| JP | 2011111672 A | 6/2011 |
| JP | 2015034327 A | 2/2015 |
| KR | 100608555 B1 | 8/2006 |
| KR | 20120008038 A | 1/2012 |
| WO | 2014097559 A1 | 6/2014 |
| WO | 2015019558 A1 | 2/2015 |

OTHER PUBLICATIONS

Extended European Search Report for European Application No. 15 887 414.9, dated Feb. 9, 2018, 13 pages.
Korean Grant of Patent for Korean Application No. 10-2017-7027323, dated May 15, 2019, with translation, 2 pages.

\* cited by examiner

HIGH-STRENGTH STEEL SHEET AND PRODUCTION METHOD THEREFOR

CROSS REFERENCE TO RELATED APPLICATIONS

This is the U.S. National Phase application of PCT/JP2015/004178, filed Aug. 20, 2015, which claims priority to Japanese Patent Application No. 2015-066220, filed Mar. 27, 2015, the disclosures of these applications being incorporated herein by reference in their entireties for all purposes.

TECHNICAL FIELD OF THE INVENTION

The present invention relates to a high-strength steel sheet excellent in punchability, having a tensile strength (TS) of 780 MPa or more, and suitable for use as automobile body frame members. The invention also relates to a method for producing the high-strength steel sheet.

BACKGROUND OF THE INVENTION

To reduce the weight of automobile bodies, high-strength steel sheets are actively used as materials of automobile components. Steel sheets used for structural members and reinforcing members of automobiles are mainly steel sheets having a tensile strength (TS) of 780 MPa or more. To strengthen a steel sheet, it is effective to utilize structural strengthening, and one method is to form a complex structure including soft ferrite and hard martensite. Generally, a steel sheet having this complex structure has good ductility, an excellent strength-ductility balance (compatibility), and relatively good press formability. However, in the steel sheet having the complex structure, its material properties such as tensile strength (TS) vary greatly in response to changes in the conditions of production such as annealing temperature in an ordinary continuous annealing line, and therefore the material properties tend to vary in the lengthwise direction of a coil.

The high-strength steel sheets used as materials of automobile components are subjected to punching and therefore required to have punchability. The required punchability is that the amount of wear of the punch and die is small, i.e., continuous punchability is excellent, and that variations in press formability of punched edge faces and their vicinities when continuous punching is performed are small.

When punching is performed in an actual component production process, it is difficult to control clearance (the clearance between the punch and die) to be constant because of issues such as the mounting accuracy of the die, and the clearance fluctuates within the range of 5 and 20%. Therefore, when variations in material properties within a single coil or between coils are large, variations in press formability of punched edge faces formed by punching and their vicinities are large. In this case, it is difficult to perform press forming stably in a continuous press line for automobiles. When stable press forming is difficult, it is feared that workability may deteriorate significantly.

In a highly formable high-strength cold-rolled steel sheet described in Patent Literature 1, certain amounts of Si and Al are added to reduce changes in structure caused by fluctuations in annealing conditions to thereby reduce variations in mechanical properties such as elongation and stretch flangeability.

Patent Literature 2 discloses a hot-rolled steel sheet in which deterioration in punchability is prevented by reducing the contents of Ti-based nitrides in the steel sheet.

CITATION LIST

Patent Literature

PTL 1: Japanese Patent No. 4640130
PTL 2: Japanese Unexamined Patent Application Publication No. 2003-342683

SUMMARY OF INVENTION

Technical Problem

With the technique described in Patent Literature 1, the variations in the material properties of the steel sheet can be reduced. However, when punching is performed in a continuous press line, the punch and die damage as the number of times the punching is performed increases, and it is inevitable that the clearance between the punch and die fluctuates. Therefore, it is difficult to maintain the formability of punched edge faces and their vicinities constant, and a problem arises in that cracking occurs during press forming in some cases. In particular, a high-strength steel sheet of 780 MPa or more is more susceptible to cracking than a steel sheet of 590 MPa or less. Therefore, in the high-strength steel sheet of 780 MPa or more, the variations in formability of punched edge faces and their vicinities directly lead to cracking during press forming. In the high-strength steel sheet with a TS of 780 MPa or more, its steel structure contains hard martensite in order to strengthen the steel sheet. Therefore, when the high-strength steel sheet is subjected to punching, voids are formed at the interface between the martensite and ferrite, causing deterioration in press formability. When the clearance is constant each time punching is performed, the formability of the punched edge faces and their vicinities is stable. However, when the clearance fluctuates, damage to punched edge faces of the steel sheet varies, and it is unfortunately difficult to perform continuous pressing stably.

In the hot-rolled steel sheet in Patent Literature 2, a ferrite-bainite structure composed mainly of ferrite is recommended. Therefore, the technique in Patent Literature 2 does not address the above problem at the martensite-ferrite interface that occurs in two-phase structure steel composed mainly of ferrite and martensite. The evaluation described in Patent Literature 2 is performed only for punching at a constant clearance, and the formability of punched edge faces is not stabilized when the clearance fluctuates.

The present invention has been made in view of the above circumstances, and it is an object to provide a high-strength steel sheet excellent in punchability and having a TS of 780 MPa or more and to provide a method for producing the high-strength steel sheet.

Solution to Problem

To solve the above problems, the present inventors have conducted extensive studies on various factors causing variations in formability of punched edge faces and their vicinities when continuous punching is performed. As a result, the inventors have found that a high-strength hot-dip galvanized steel sheet having a TS of 780 MPa or more and excellent in punchability can be obtained by using, as its steel structure, a three-phase structure including a ferrite phase, a martensite phase, and a bainite phase and finely controlling average crystal grain diameters of crystal grains in the martensite phase. The present invention is summarized as follows.

[1] A high-strength steel sheet having a tensile strength of 780 MPa or more and excellent in punchability, the high-strength steel sheet having a chemical composition comprising, in mass %, C: from 0.07% to 0.15% inclusive, Si: from 0.01% to 0.50% inclusive, Mn: from 2.0% to 3.0% inclusive, P: from 0.001% to 0.050% inclusive, S: from 0.0005% to 0.010% inclusive, sol. Al: from 0.005% to 0.100% inclusive, N: from 0.0001% to 0.0060% inclusive, Ti: from 0.01% to 0.10% inclusive, and Nb: from 0.01% to 0.10% inclusive, with the balance being Fe and unavoidable impurities, wherein the high-strength steel sheet has a steel structure containing a ferrite phase, a martensite phase, and a bainite phase, wherein an area fraction of the martensite phase is from 20% to 50% inclusive, and wherein the martensite phase includes crystal grains with an average crystal grain diameter of less than 1.0 µm at an area fraction of 5% to 30%, crystal grains with an average crystal grain diameter of 1.0 µm to 4.0 µm at an area fraction of 70% to 95%, and crystal grains with an average crystal grain diameter of more than 4.0 µm at an area fraction of less than 5%.

[2] The high-strength steel sheet according to [1], wherein, in the martensite phase, the crystal grains with an average crystal grain diameter of 1.0 µm to 4.0 µm include crystal grains with a major axis of 1.0 µm to 3.0 µm at an area fraction of less than 20% and crystal grains with a major axis of more than 3.0 µm at an area fraction of 80% or more.

[3] The high-strength steel sheet according to [1] or [2], wherein the chemical composition further comprises, in mass %, at least one selected from Mo: from 0.05% to 1.00% inclusive, Cr: from 0.05% to 1.00% inclusive, V: from 0.02% to 0.50% inclusive, Zr: from 0.02% to 0.20% inclusive, B: from 0.0001% to 0.0030% inclusive, Cu: from 0.05% to 1.00% inclusive, and Ni: from 0.05% to 1.00% inclusive.

[4] The high-strength steel sheet according to any of [1] to [3], wherein the chemical composition further comprises, in mass %, at least one element selected from Ca: from 0.001% to 0.005% inclusive, Sb: from 0.0030% to 0.0100% inclusive, and REM: from 0.001% to 0.005% inclusive.

[5] A method for producing the high-strength steel sheet according to any of [1] to [4], the method comprising subjecting a steel slab having the chemical composition according to [1], [3], or [4] to hot rolling, cold rolling, primary annealing, and secondary annealing, wherein the primary annealing is performed at a primary annealing temperature of from an Ac3 point to the Ac3 point+60° C. inclusive for a primary annealing time of from 10 seconds to 200 seconds inclusive, the primary annealing time being a holding time at the primary annealing temperature, wherein the secondary annealing is performed at an annealing temperature equal to or lower than the Ac3 point for a secondary annealing time of from 10 seconds to 100 seconds inclusive, the annealing temperature being (the primary annealing temperature −80° C.) to (the primary annealing temperature −30° C.), the secondary annealing time being a holding time at the secondary annealing temperature, and wherein, in the secondary annealing, cooling is performed down to a cooling stop temperature of 400 to 550° C. such that a residence time during which the steel sheet is held at 400° C. to 550° C. is from 20 seconds to 100 seconds inclusive.

[6] The method for producing the high-strength steel sheet according to [5], the method further comprising, after the secondary annealing, performing cooling and then performing galvanization.

[7] The method for producing the high-strength steel sheet according to [6], the method further comprising, after the galvanization, performing galvannealing.

Advantageous Effects of Invention

According to the present invention, a high-strength steel sheet having a high-tensile strength of 780 MPa or more and excellent in punchability is obtained. The application of the high-strength steel sheet of the present invention to frame members of automobile bodies can contribute to improvement in collision safety and weight reduction significantly.

In the present invention, "excellent in punchability" means that $\Delta\lambda$ derived using a method described in EXAMPLES is 10 or less and $\lambda/\text{ave}\lambda_{5\text{-}20}$ is from 0.90 to 1.20 inclusive. Preferably, $\Delta\lambda$ is 8 or less, and $\lambda/\text{ave}\lambda_{5\text{-}20}$ is from 1.00 to 1.15 inclusive.

DESCRIPTION OF EMBODIMENTS

Embodiments of the present invention will next be described. However, the present invention is not limited to the following embodiments.

<High-Strength Steel Sheet>

First, the chemical composition of the high-strength steel sheet of the present invention will be described. In the following description, "%" representing the content of a component means "mass %."

The high-strength steel sheet of the present invention has a chemical composition containing, in mass %, C: from 0.07% to 0.15% inclusive, Si: from 0.01% to 0.50% inclusive, Mn: from 2.0% to 3.0% inclusive, P: from 0.001% to 0.050% inclusive, S: from 0.0005% to 0.010% inclusive, sol. Al: from 0.005% to 0.100% inclusive, N: from 0.0001% to 0.0060% inclusive, Ti: from 0.01% to 0.10% inclusive, and Nb: from 0.01% to 0.10% inclusive, with the balance being Fe and unavoidable impurities.

C: From 0.07% to 0.15% Inclusive

C is an element effective in strengthening the steel sheet and contributes to the strengthening through the formation of martensite. C forms fine carbides or carbonitrides with carbide-forming elements such as Nb and Ti to thereby contribute to the strengthening. To obtain these effects, the content of C must be 0.07% or more. If the content of C exceeds 0.15%, spot-weldability deteriorates significantly. If the content of C exceeds 0.15%, the amount of the martensite phase increases, and this causes the steel sheet to be hardened, so that press formability may deteriorate. Therefore, the content of C is from 0.07% to 0.15% inclusive. In terms of ensuring a TS of 780 MPa or more stably, the content of C is preferably 0.08% or more. In terms of ensuring the formability of punched edge faces and their vicinities stably after punching, the content of C is more preferably 0.12% or less.

Si: From 0.01% to 0.50% Inclusive

The addition of Si causes deterioration in surface properties due to the formation of red scale etc. and deterioration in coating adherence and adhesion. Therefore, the content of Si is 0.50% or less. In a hot-dip galvanized steel sheet, the content of Si is preferably 0.20% or less. Si is an element that improves ductility and contributes to improvement in strength. To obtain these effects, the content of Si must be 0.01% or more. Therefore, the content of Si is from 0.01% to 0.50% inclusive.

Mn: From 2.0% to 3.0% Inclusive

Mn is an element effective in increasing the strength of the steel sheet and is an element that functions effectively to obtain a complex structure. Mn is an element that lowers the Ac3 transformation point. In the present invention, to perform annealing stably in the austenite single phase region, the content of Mn must be 2.0% or more. Also in terms of ensuring the strength by allowing low-temperature transformation phases to be stably formed during a cooling process from the austenite present at the time of heat annealing, the content of Mn is preferably 2.0% or more. If the content of Mn exceeds 3.0%, segregation of Mn in a portion positioned one-half the thickness of the sheet, i.e., a so-called Mn band, occurs significantly. Since the hardenability of the segregated portion is high, a large amount of belt-shaped martensite is formed in the direction of rolling, causing a significant deterioration in press formability. Therefore, the content of Mn is from 2.0% to 3.0% inclusive. Preferably, the content of Mn is from 2.2% to 2.8% inclusive.

P: From 0.001% to 0.050% Inclusive

P is an element that dissolves in the steel and contributes to strengthening of the steel sheet. However, P is also an element that segregates at grain boundaries and therefore causes a reduction in grain boundary binding force and deterioration in workability. In addition, P is concentrated on the surface of the steel sheet, and this causes a reduction in chemical conversion treatability, corrosion resistance, etc. If the content of P exceeds 0.050%, the above influences become significant. However, an excessive reduction in the content of P causes an increase in production cost. Therefore, the content of P is from 0.001% to 0.050% inclusive.

S: From 0.0005% to 0.010% Inclusive

S is an element that adversely affects workability. When the content of S is high, S is present as MnS inclusions. This causes, in particular, deterioration in local ductility of the material and results in deterioration in workability. Moreover, the presence of sulfides causes deterioration in weldability. These adverse effects can be avoided when the content of S is 0.010% or less. It is preferable that the content of S is 0.005% or less, because press workability can be improved significantly. However, an excessive reduction in the content of S causes an increase in production cost. Therefore, the content of S is from 0.0005% to 0.010% inclusive.

Sol. Al: From 0.005% to 0.100% Inclusive

Al is an element effective as a deoxidizing agent. To obtain this effect, the content of sol. Al is 0.005% or more. If the content of sol. Al exceeds 0.100%, the cost of raw materials increases, and Al may cause surface defects in the steel sheet. Therefore, the content of Al in the form of sol. Al is from 0.005% to 0.100% inclusive.

N: From 0.0001% to 0.0060% Inclusive

In the present invention, it is preferable that the content of N is as small as possible. In the present invention, the allowable content of N is up to 0.0060%. An excessive reduction in the content of N causes an increase in production cost. Therefore, the content of N is from 0.0001% to 0.0060% inclusive.

Ti: From 0.01% to 0.10% Inclusive

Fine precipitates of Ti (mainly carbide, nitride, and carbonitride. These are hereinafter referred to as carbonitrides) contribute to an increase in strength and function advantageously to reduce the size of the ferrite and martensite. To obtain these functions, the content of Ti must be 0.01% or more. The content of Ti is preferably 0.02% or more. When a large amount of Ti is added, it is not possible to dissolve the entire amount of carbonitrides during re-heating in an ordinary hot-rolling process, and coarse carbonitrides remain present. The addition of a large amount of Ti causes not only deterioration in press formability but also an increase in alloy cost. Therefore, the content of Ti must be 0.10% or less. The content of Ti is from 0.01% to 0.10% inclusive.

Nb: From 0.01% to 0.10% Inclusive

Fine precipitates of Nb (mainly carbonitrides) contribute to an increase in strength and function advantageously to reduce the size of the ferrite and martensite. To obtain these functions through the contained Nb, the Nb content must be 0.01% or more. The Nb content is preferably 0.02% or more. When a large amount of Nb is added, it is not possible to dissolve the entire amount of carbonitrides during re-heating in an ordinary hot-rolling process, and coarse carbonitrides remain present. In this case, not only the press formability deteriorates, but also the alloy cost increases. Therefore, the content of Nb must be 0.10% or less. As described above, the content of Nb is from 0.01% to 0.10% inclusive.

In addition to the above components, the chemical composition of the high-strength steel sheet of the present invention may further contain, in mass %, at least one selected from Mo: from 0.05% to 1.00% inclusive, Cr: from 0.05% to 1.00% inclusive, V: from 0.02% to 0.50% inclusive, Zr: from 0.02% to 0.20% inclusive, B: from 0.0001% to 0.0030% inclusive, Cu: from 0.05% to 1.00% inclusive, and Ni: from 0.05% to 1.00% inclusive.

Mo: From 0.05% to 1.00% Inclusive

Mo is an element that improves hardenability and contributes to strengthening through the formation of martensite. Mo may be contained as needed. To obtain these effects, the content of Mo is preferably 0.05% or more. If the content of Mo exceeds 1.00%, not only the above effects are saturated, but also the raw material cost increases. Therefore, preferably, the content of Mo is from 0.05% to 1.00% inclusive.

Cr: From 0.05% to 1.00% Inclusive

Cr is an element that improves hardenability and contributes to strengthening through the formation of martensite. Cr may be contained as needed. To obtain these effects, the content of Cr is preferably 0.05% or more. If the content of Cr exceeds 1.00%, not only the above effects are saturated, but also the raw material cost increases. Therefore, preferably, the content of Cr is from 0.05% to 1.00% inclusive.

V: From 0.02% to 0.50% Inclusive

V forms fine carbonitrides and can thereby contribute to an increase in strength, as do Nb and Ti. V may be contained as needed. To obtain the above effect, the content of V is preferably 0.02% or more. If the content of V exceeds 0.50%, not only the effect is saturated, but also the raw material cost increases. Therefore, preferably, the content of V is 0.50% or less.

Zr: From 0.02% to 0.20% Inclusive

Zr also forms fine carbonitrides and is effective in increasing strength. Zr may be contained as needed. To obtain the above effect, the content of Zr must be 0.02% or more. If the content of Zr exceeds 0.20%, not only the effect is saturated, but also the raw material cost increases. Therefore, preferably, the content of Zr is from 0.02% to 0.20% inclusive.

B: From 0.0001% to 0.0030% Inclusive

B has the function of suppressing the formation and growth of ferrite from austenite grain boundaries and may be contained as needed. The effect of B is obtained when its content is 0.0001% or more. If the content of B exceeds 0.0030%, workability deteriorates. Therefore, when B is contained, its content is preferably within the range from 0.0001% to 0.0030% inclusive. When B is contained, it is preferable to prevent the formation of BN so that the above effect is obtained. Therefore, it is preferable that a combination of B and Ti is contained.

Cu: From 0.05% to 1.00% Inclusive

Cu is effective in increasing the hardenability of the steel to thereby strengthening a hot-rolled steel sheet. To obtain this effect, the content of Cu must be 0.05% or more. However, when the content of Cu exceeds 1.00%, not only the effect is saturated, but also hot ductility deteriorates, so that significant surface defects occur. In addition, the raw material cost increases. Therefore, preferably, the content of Cu is 0.05% to 1.00%.

Ni: From 0.05% to 1.00% Inclusive

Ni is effective in increasing the hardenability of the steel to thereby strengthening a hot-rolled steel sheet. To obtain this effect, the content of Ni must be 0.05% or more. However, when the content of Ni exceeds 1.00%, not only the effect is saturated, but also hot ductility deteriorates, so that significant surface defects occur. In addition, the raw material cost increases. Therefore, preferably, the content of Ni is 0.05% to 1.00%.

In addition to the above components, the chemical composition of the high-strength steel sheet of the present invention may further contain, in mass %, at least one element selected from Ca: from 0.001% to 0.005% inclusive, Sb: from 0.0030% to 0.0100% inclusive, and REM: from 0.001% to 0.005% inclusive.

Ca: From 0.001% to 0.005% Inclusive

Ca has the effect of improving ductility through control of the morphology of sulfides such as MnS. However, even when a large amount of Ca is contained, the effect tends to be saturated. Therefore, when Ca is contained, its content is preferably from 0.0001% to 0.0050% inclusive.

Sb: From 0.0030% to 0.0100% Inclusive

Sb is an element that tends to segregate on the surface etc. and has the function of suppressing reactions in a surface layer during production steps such as nitrogen absorption and decarbonization. The addition of Sb allows reactions of elements such as nitrogen and carbon whose contents are likely to vary to be suppressed even when the steel material is exposed to a high-temperature atmosphere during heating in a hot-rolling step or during annealing, and therefore Sb has the effect of preventing significant component variations. In the present invention, when Sb is contained, it is preferable that the content of Sb is 0.0030% to 0.0100%. In the present invention, it is more preferable that the content of Sb is 0.0060% to 0.0100%.

REM: From 0.001% to 0.005% Inclusive

REM has the function of controlling the morphology of sulfide-based inclusions and thereby contributes to improvement in press formability. To obtain this effect, the content of REM must be 0.001% or more. However, the addition of a large amount of REM causes the sulfide-based inclusions to be coarsened, and punchability deteriorates. Therefore, the upper limit of the content of REM is preferably 0.005% or less.

In the chemical composition in the present invention, the balance other than the above elements is Fe and unavoidable impurities.

In the present invention, it is preferable that the above-described basic composition is satisfied and also formula (1) is satisfied. In formula (1), the symbols of elements represent the contents of the elements.

$$0.05 \leq C-(12/93)Nb-(12/48)(Ti-(48/14)N-(48/32)S) \leq 0.12 \quad (1)$$

Formula (1) above defines the amount of C that is not fixed as carbides. If the amount of C present is large and exceeds 0.12%, the fraction of the martensite increases, and the ductility may decrease. Therefore, the amount of C not fixed as carbides that is calculated from formula (1) is preferably 0.12% or less. If the amount of C not fixed as carbides is less than 0.05%, the amount of C in austenite during annealing in a two-phase region after cold-rolling becomes small, and therefore the amount of the martensite phase formed after cooling becomes small, so that it may be difficult to obtain a high strength of 780 MPa or more. Therefore, preferably, the amount of C not fixed as carbides is 0.05% or more. The amount is preferably 0.07% or more.

Next, the steel structure of the high-strength steel sheet of the present invention will be described. The steel structure of the high-strength steel sheet of the present invention includes a ferrite phase, a martensite phase, and a bainite phase. The rest of the structure includes a perlite phase, a retained austenite phase, carbides, etc. The allowable content of these phases is such that their total area fraction is 5% or less. However, at least 90% of the rest of the structure excluding the ferrite and martensite phases is the bainite phase. When the steel structure at a depth of ⅜ the thickness of the sheet from its surface is within the ranges of the present invention, the effects of the present invention are obtained.

The ferrite phase and the bainite phase are softer than the martensite phase, and their area fractions are not particularly specified. The area fractions of the ferrite and bainite phases are each 20% or more. To ensure strength and stable punchability, the total area fraction of the ferrite and bainite phases is preferably 50% to 80% and more preferably 60% to 80%.

The martensite phase is a hard phase and is effective in increasing the strength of the steel sheet through transformation strengthening. To stably ensure a TS of 780 MPa or more, the area fraction of the martensite phase must be 20% or more. Since the martensite is hard, it may serve as origins of voids formed during punching because of the difference in formability between the martensite and the soft ferrite phase. To ensure stable punchability, at least a prescribed amount of martensite must be present. Also from this point of view, the area fraction of the martensite must be 20% or more. If the area fraction of the martensite exceeds 50%, the punchability may deteriorate. Therefore, the area fraction of the martensite is 50% or less. Preferably, the area fraction of the martensite is 40% or less.

In the martensite phase, the area fraction of crystal grains with an average crystal grain diameter of less than 1.0 μm is 5% to 30%. The average crystal grain diameter of the martensite phase differs from the grain diameter of prior austenite during annealing but is equal to the grain diameter of the prior austenite after quenching. In the present invention, the average crystal grain diameters and morphology of the martensite phase after secondary annealing greatly affect the formation of voids during punching. The smaller the crystal grains of the martensite phase, the smaller the voids formed during punching. Therefore, smaller crystal grains are particularly preferable when punching is performed with an appropriate clearance. However, to reduce variations in workability of punched edge faces even when the clearance fluctuates, it is necessary that voids be formed suitably during punching. Therefore, the area fraction of the crystal grains with an average crystal grain diameter of less than 1.0 µm in the martensite phase must be within the range of 5% and 30%. The average crystal grain diameter of a crystal grain means the diameter of a perfect circle having the same area as the crystal grain and can be measured by a method described in EXAMPLES.

In the martensite phase, the area fraction of crystal grains with an average crystal grain diameter of 1.0 to 4.0 µm is 70 to 95%. The crystal grains with an average crystal grain diameter of 1.0 to 4.0 µm are important in terms of ensuring the formability of punched edge faces stably even when the punching clearance fluctuates. This effect can be obtained when the area fraction is within the range of 70% and 95%. Preferably, the area fraction is 80% or more.

It is preferable that, in the martensite phase, the crystal grains with an average crystal grain diameter of 1.0 µm to 4.0 µm include crystal grains with a major axis of 1.0 µm to 3.0 µm at an area fraction of less than 20%, because the formability of punched edge faces can be ensured stably even when the punching clearance fluctuates. It is preferable that, in the martensite phase, the crystal grains with an average crystal grain diameter of 1.0 µm to 4.0 µm further include crystal grains with a major axis of more than 3.0 µm at an area fraction of 80% or more, because the formability of punched edge faces can be ensured stably even when the punching clearance fluctuates. The major axis of a crystal grain in the martensite phase means the length of the longest straight line in the crystal grain obtained by structure observation described in the EXAMPLES.

In the crystal grains with an average crystal grain diameter of 1.0 µm to 4.0 µm in the martensite phase, it is preferable that the area fraction of the crystal grains with a major axis of 1.0 µm to 3.0 µm is less than 20%, because the formability of punched edge faces can be ensured stably even when the punching clearance fluctuates. If the area fraction of the crystal grains with a major axis of 1.0 µm to 3.0 µm is 20% or more, the formability of punched edge faces varies when the punching clearance fluctuates. In this case, cracking may occur during press forming in some cases, causing a problem.

It is preferable that the area fraction of the crystal grains with a major axis of more than 3.0 µm is 80% or more, because the formability of punched edge faces can be ensured even when the punching clearance fluctuates. If the area fraction of the crystal grains with a major axis of more than 3.0 µm is less than 80%, the formability of punched edge faces varies when the punching clearance fluctuates. In this case, cracking may occur during press forming in some cases, causing a problem.

In the martensite phase, the area fraction of crystal grains with an average crystal grain diameter of more than 4.0 µm is less than 5%. When the martensite phase contains coarse crystal grains, voids are likely to be formed during punching. It is therefore preferable that the crystal grains are small. In particular, crystal grains of more than 4.0 µm tend to cause significant deterioration in punchability. However, when the area fraction of such crystal grains is less than 5%, the deterioration is allowable.

<Method for Producing High-Strength Steel Sheet>

Next, a description will be given of a method for producing the high-strength steel sheet of the present invention. The high-strength steel sheet of the present invention is produced by subjecting a steel slab having the chemical composition described above to hot rolling, cold rolling, primary annealing, optional light reduction rolling, optional pickling, and then secondary annealing. The production method and conditions will next be described.

If the temperature at which the steel slab is reheated is lower than 1,200° C., precipitates containing Ti and Nb do not re-dissolve but are coarsened. In this case, not only the precipitation strengthening ability of the precipitates is lost, but also their pinning effect of preventing recrystallization is lost, so that it may be difficult to ensure stable punchability. Therefore, preferably, the temperature at which the steel slab is reheated is 1,200° C. or higher. No particular limitation is imposed on the upper limit of the reheating temperature. In terms of energy efficiency and yield, the reheating temperature is preferably lower than 1,400° C. and more preferably 1,300° C. or lower.

If the finishing temperature of the hot rolling is equal to or lower than the Ar3 point, coarse grains are formed in a surface layer, and therefore it is difficult to form a uniform steel structure, so that stable punchability may not be obtained. It is preferable that the finishing temperature is equal to or higher than the Ar3 point. No particular limitation is imposed on the upper limit of the finishing temperature. Preferably, the finishing temperature is 1,000° C. or lower.

If the coiling temperature is lower than 500° C., the amount of precipitates containing Ti and Nb is small, and the effect of preventing recrystallization during annealing may not be obtained sufficiently. If the coiling temperature is higher than 700° C., coarse precipitates are formed, and the effect of preventing recrystallization during annealing may not be sufficient. Therefore, preferably, the coiling temperature is 500° C. to 700° C. The coiling temperature is more preferably 550° C. to 650° C.

If necessary, the hot-rolled steel sheet is then pickled according to a routine procedure to remove scales. Then the resulting hot-rolled steel sheet is cold-rolled to produce a cold-rolled steel sheet with a final thickness. The rolling reduction in the cold rolling is preferably 40% or more. A rolling reduction of less than 40% is not preferable because the steel sheet structure after finish annealing is coarse-grained and the strength-ductility balance may deteriorate. The rolling reduction is more preferably 50% or more. If the rolling reduction exceeds 90%, a load on the rolling rolls increases, and rolling troubles such as chattering and breakage of the sheet occur. Therefore, preferably, the rolling reduction in the cold rolling is 90% or less. The rolling reduction is more preferably 80% or less.

The cold-rolled steel sheet is then subjected to primary annealing. It is preferable in terms of improving productivity that the primary annealing and secondary annealing described later are performed as continuous annealing.

The primary annealing temperature in the primary annealing is from the Ac3 point to the Ac3 point+60° C. inclusive. When the primary annealing temperature is equal to or higher than the Ac3 point, the steel structure after the secondary annealing is made uniform, and the desired properties can be obtained. If the primary annealing temperature is lower than the Ac3 point, the structure tends to be non-uniform even after the secondary annealing, and the desired properties cannot be obtained. If the primary annealing temperature is higher than the Ac3 point+60° C., the structure becomes coarse. In this case, the ratio of the crystal grains with an average crystal grain diameter of more than 4.0 µm in the martensite phase after the secondary annealing increases, and the properties after the secondary annealing deteriorate. This primary annealing temperature is not preferable also in terms of energy efficiency. Therefore, the primary annealing temperature is from the Ac3 point to the Ac3 point+60° C. inclusive.

The primary annealing time in the primary annealing is from 10 seconds to 200 seconds inclusive. If the primary annealing time is shorter than 10 seconds, recrystallization does not proceed sufficiently, and a steel sheet with the desired properties cannot be obtained. If the primary annealing time exceeds 200 seconds, the ratio of the crystal grains with an average crystal grain diameter of more than 4.0 μm in the martensite phase after the secondary annealing increases. In this case, not only the properties after the secondary annealing deteriorate, but also a large amount of energy is consumed, so that the production cost increases. Therefore, the primary annealing time is from 10 seconds to 200 seconds inclusive.

Preferably, the cooling rate (average cooing rate) during cooling in the primary annealing is 10° C./s or more at least in the temperature range from the primary annealing temperature to 550° C. If the average cooing rate is less than 10° C./s, a large amount of perlite is formed, and a complex structure including ferrite, martensite, and bainite may not be obtained. The upper limit of the cooing rate is not particularly specified. However, to prevent deterioration of the shape of the steel sheet, the cooling rate is preferably 200° C./s or less. The cooling rate is preferably 20° C./s to 50° C./s.

After the primary annealing, the resulting steel sheet is subjected to light reduction rolling and then pickling. The pickling and the light reduction rolling are not essential and are performed for the purpose of correcting the shape of the steel sheet. For this purpose, it is preferable that the rolling reduction is 0.3% to 3.0%. The pickling is performed to remove scales, and general conditions may be appropriately used.

The steel sheet subjected to the light reduction rolling and the pickling after the primary annealing is then subjected to secondary annealing. The secondary annealing temperature in the secondary annealing is equal to or lower than the Ac3 point and is from (the primary annealing temperature −80° C.) to (the primary annealing temperature −30° C.). In the present invention, it is necessary to bring the steel into a ferrite-austenite coexistence region by controlling the secondary annealing temperature. To control the fractions of phases in the final structure, it is necessary to control the secondary annealing temperature within the specific range with respect to the primary annealing temperature. If the secondary annealing temperature is lower than (the primary annealing temperature −80° C.), it is difficult to ensure a tensile strength of 780 MPa stably. At a temperature higher than (the primary annealing temperature −30° C.), the structure becomes excessively coarse. In this case, the area fraction of the crystal grains with an average crystal grain diameter of 1.0 μm to 4.0 μm in the martensite phase tends to be less than 70%, and the area fraction of the crystal grains with an average crystal grain diameter of more than 4.0 μm becomes 5% or more, so that voids are likely to be formed excessively during punching. Therefore, the secondary annealing temperature is equal to or lower than the Ac3 point and is within the range of (the primary annealing temperature −80° C.) and (the primary annealing temperature −30° C.)

The secondary annealing time in the secondary annealing is from 10 seconds to 100 seconds inclusive. If the secondary annealing time is shorter than 10 seconds, recrystallization does not proceed sufficiently, and a steel sheet with the desired properties cannot be obtained. If the secondary annealing time exceeds 100 seconds, the area fraction of the crystal grains with an average crystal grain diameter of 1.0 μm to 4.0 μm in the martensite phase tends to be less than 70%, and the area fraction of the crystal grains with an average crystal grain diameter of more than 4.0 μm tends to be 5% or more. Moreover, in the crystal grains with an average crystal grain diameter of 1.0 μm to 4.0 μm in the martensite phase, the area fraction of the crystal grains with a major axis of 1.0 μm to 3.0 μm tends to be 20% or more, and the area fraction of the crystal grains with a major axis of more than 3.0 μm tends to be less than 80%. When the desired microstructure is not obtained, the formability of punched edge faces is poor. In addition, a large amount of energy is consumed, and the production cost increases. Therefore, the secondary annealing time is from 10 seconds to 100 seconds inclusive.

Preferably, the cooling rate (average cooing rate) during cooling in the secondary annealing is 10° C./s or more at least in the temperature range from the secondary annealing temperature to 550° C. If the average cooing rate is less than 10° C./s, a large amount of perlite is formed, and a complex structure including ferrite, martensite, and bainite may not be obtained. The upper limit of the cooing rate is not particularly specified. However, to prevent deterioration of the shape of the steel sheet, the cooling rate is preferably 200° C./s or less. The cooling rate is preferably 20° C./s to 50° C./s.

The cooling stop temperature during cooling in the secondary annealing is 400° C. to 550° C. The cooling stop temperature is important in terms of the formation of the bainite phase. If the cooling stop temperature is lower than 400° C., a large proportion of the low-temperature transformation phases is the martensite phase, and the formability of punched edge faces is poor. If the cooling stop temperature exceeds 550° C., pearlite and cementite are formed, and the formability of punched edge faces is poor. Therefore, preferably, the cooling stop temperature is 400° C. to 550° C.

During cooling in the secondary annealing, the period of time during which the steel sheet is at 400° C. to 550° C. (residence time (which may be referred to as holding time) is 20 seconds to 100 seconds. The residence time is important in terms of the formation of a certain amount of bainite phase. If the residence time is shorter than 20 seconds, the formation of the bainite phase is insufficient, and the formability of punched edge faces is poor. If the residence time exceeds 100 seconds, the amount of the bainite phase formed is excessively large. In this case, the prescribed amount of martensite cannot be formed, and the formability of punched edge faces is poor. Therefore, the residence time is 20 seconds to 100 seconds.

After the lapse of the residence time, the cooling in the secondary annealing is continued until room temperature is reached under the condition of an average cooing rate of 10° C./s or more. If the average cooing rate is less than 10° C./s, the martensite phase is not easily formed, and the formability of punched edge faces may be poor. The upper limit of the average cooing rate during the cooling is not particularly specified. However, to prevent deterioration of the shape of the steel sheet, the average cooing rate is preferably 100° C./s or less. The average cooing rate is more preferably 20° C./s to 50° C./s.

The high-strength steel sheet of the present invention can be produced in the manner described above. The high-strength steel sheet obtained as described above may be used as a product without any other treatment or may be cooled and subjected to coating treatment such as hot-dip coating or electroplating to obtain a product.

For example, when the coating treatment used is hot-dip galvanization widely used for automobile steel sheets etc., the treatment may be performed as follows. After the above-described soaking and cooling treatment or further the overaging treatment (the above treatment in which the steel sheet is held at 400° C. to 550° C. for a prescribed time during cooling in the secondary annealing) performed in an upstream continuous annealing furnace in a hot-dip galvanization line, the steel sheet is immersed in a hot-dip galvanization bath to form a hot-dip galvanized layer on the surface of the steel sheet. Then the resulting steel sheet may be subjected to an alloying treatment to form a galvannealed steel sheet. The continuous annealing including the soaking and cooling treatment or including the soaking and cooling treatment and the overaging treatment may be separated from the coating treatment, and they may be performed in different lines.

The galvanized layer is a layer containing mainly Zn. The galvannealed layer is a layer containing mainly an Fe—Zn alloy that is formed by diffusion of Fe in the steel into the galvanized coating through a galvannealing reaction.

The galvanized layer and the galvannealed layer may contain Fe, Al, Sb, Pb, Bi, Mg, Ca, Be, Ti, Cu, Ni, Co, Cr, Mn, P, B, Sn, Zr, Hf, Sr, V, Se, and REM in addition to Zn so long as the effects of the present invention are not impaired.

The annealed steel sheet or the steel sheet subjected to the coating treatment may be subjected to temper rolling or levelling for the purpose of shape correction, surface rough-ness adjustment, improvement in mechanical properties, etc. The total percentage elongation in the temper rolling and the levelling is preferably within the range of 0.2% to 3%. This is because, if the total percentage elongation is less than 0.2%, the prescribed purposes such as shape correction are not achieved. If the total percentage elongation exceeds 3%, a significant reduction in ductility occurs.

EXAMPLES

Molten steel having a chemical composition shown in Table 1 was produced in a converter. Then hot rolling was performed at a slab reheating temperature of 1,200° C., a hot-rolling finishing temperature of 880° C., and a coiling temperature of 600° C., followed by pickling and cold rolling at a rolling reduction of 60%. Then only primary annealing or the primary annealing, light reduction rolling at 0.5%, pickling, and secondary annealing were performed under conditions shown in Table 2 to produce a cold-rolled steel sheet with a thickness of 1.2 mm, a hot-dip galvanized steel sheet (GI steel sheet), and a galvannealed steel sheet (GA steel sheet). In this case, the hot-dip galvanization treatment was performed such that the coating weight per side was adjusted to 50 g/m$^2$ (double-sided coating). As for the GA steel sheet, the content of Fe in the coating layer was adjusted to 9% to 12% by mass. The cooling in the primary annealing and the cooling in the secondary annealing were performed at an average cooing rate of 20° C./s, respectively.

TABLE 1

| Steel No | C | Si | Mn | P | S | sol. Al | N | Ti | Nb | V |
|---|---|---|---|---|---|---|---|---|---|---|
| A | 0.086 | 0.04 | 2.41 | 0.015 | 0.0018 | 0.036 | 0.0034 | 0.030 | 0.025 | |
| B | 0.075 | 0.41 | 2.21 | 0.012 | 0.0015 | 0.034 | 0.0028 | 0.019 | 0.021 | 0.03 |
| C | 0.114 | 0.19 | 2.65 | 0.011 | 0.0022 | 0.044 | 0.0035 | 0.065 | 0.025 | |
| D | 0.089 | 0.03 | 2.05 | 0.012 | 0.0015 | 0.036 | 0.0031 | 0.047 | 0.015 | |
| E | 0.101 | 0.04 | 2.52 | 0.013 | 0.0013 | 0.034 | 0.0028 | 0.021 | 0.032 | |
| F | 0.103 | 0.21 | 2.48 | 0.014 | 0.0015 | 0.036 | 0.0035 | 0.026 | 0.026 | |
| G | 0.131 | 0.42 | 2.64 | 0.012 | 0.0012 | 0.035 | 0.0028 | 0.042 | 0.041 | |
| H | 0.050 | 0.02 | 2.20 | 0.015 | 0.0020 | 0.034 | 0.0028 | 0.042 | | |
| I | 0.081 | 1.65 | 2.79 | 0.020 | 0.0018 | 0.035 | 0.0048 | 0.025 | 0.012 | |
| J | 0.078 | 0.20 | 1.74 | 0.020 | 0.0019 | 0.042 | 0.0048 | 0.019 | 0.020 | |
| K | 0.155 | 0.25 | 2.81 | 0.020 | 0.0017 | 0.038 | 0.0050 | 0.025 | 0.025 | |

| Steel No | B | Cr | Mo | Cu | Ni | Others | Remarks |
|---|---|---|---|---|---|---|---|
| A | 0.0013 | | | | | | Inventive Example |
| B | 0.0010 | | | | | | Inventive Example |
| C | 0.0008 | | | | | | Inventive Example |
| D | | | | | | Zr 0.02 | Inventive Example |
| E | 0.0011 | 0.11 | | | | REM 0.003 | Inventive Example |
| F | 0.0012 | | 0.12 | | | | Inventive Example |
| G | 0.0013 | | | 0.20 | 0.11 | Ca 0.0020, Sb 0.0080 | Inventive Example |
| H | 0.0015 | | | | | | Comparative Example |
| I | 0.0018 | | | | | | Comparative Example |
| J | 0.0010 | | | | | | Comparative Example |
| K | 0.0011 | | | | | | Comparative Example |

TABLE 2

| Steel sheet | Steel | A3 point (° C.) | Primary annealing Annealing temperature (° C.) | Annealing time (s) | Secondary annealing Annealing temperature (° C.) | Annealing time (s) |
|---|---|---|---|---|---|---|
| 1 | A | 817 | 840 | 50 | 800 | 30 |
| 2 | | | 840 | 50 | 740 | 30 |
| 3 | | | 840 | 50 | 780 | 30 |
| 4 | | | 840 | 150 | 780 | 30 |
| 5 | | | 880 | 50 | 800 | 30 |
| 6 | | | 780 | 50 | — | — |
| 7 | | | 840 | 50 | — | — |
| 8 | | | 780 | 50 | 820 | 30 |
| 9 | B | 839 | 860 | 50 | 820 | 30 |
| 10 | | | 860 | 50 | 790 | 30 |
| 11 | | | 860 | 50 | 820 | 30 |
| 12 | | | 860 | 500 | 850 | 30 |
| 13 | | | 810 | 50 | 790 | 30 |
| 14 | | | 810 | 50 | — | — |
| 15 | | | 860 | 50 | — | — |
| 16 | C | 822 | 840 | 50 | 790 | 30 |
| 17 | | | 840 | 50 | 790 | 30 |
| 18 | | | 780 | 50 | 850 | 30 |
| 19 | D | 831 | 860 | 50 | 790 | 60 |
| 20 | | | 860 | 50 | 820 | 30 |
| 21 | | | 860 | 50 | 850 | 30 |
| 22 | E | 802 | 840 | 50 | 790 | 30 |
| 23 | F | 818 | 840 | 50 | 790 | 30 |
| 24 | G | 810 | 840 | 50 | 790 | 30 |
| 25 | H | 840 | 820 | 50 | 820 | 30 |
| 26 | I | 880 | 820 | 50 | 820 | 30 |
| 27 | J | 848 | 820 | 50 | 820 | 30 |
| 28 | K | 796 | 840 | 50 | 720 | 30 |
| 29 | A | 817 | 840 | 50 | 800 | 150 |
| 30 | | | 840 | 50 | 800 | 450 |

| Steel sheet | Secondary annealing Cooling stop temperature (° C.) | Residence time (s) | Coating | Remarks |
|---|---|---|---|---|
| 1 | 478 | 45 | No | Inventive Example |
| 2 | 468 | 42 | Yes(GA) | Comparative Example |
| 3 | 472 | 45 | Yes(GA) | Inventive Example |
| 4 | 486 | 43 | Yes(GA) | Inventive Example |
| 5 | 475 | 38 | No | Comparative Example |
| 6 | 482 | 35 | Yes(GA) | Comparative Example |
| 7 | 475 | 65 | Yes(GA) | Comparative Example |
| 8 | 475 | 80 | Yes(GA) | Comparative Example |
| 9 | 478 | 45 | No | Inventive Example |
| 10 | 479 | 42 | Yes(GI) | Inventive Example |
| 11 | 300 | 43 | Yes(GA) | Comparative Example |
| 12 | 483 | 44 | Yes(GA) | Comparative Example |
| 13 | 501 | 45 | Yes(GA) | Comparative Example |
| 14 | 479 | 59 | Yes(GA) | Comparative Example |
| 15 | 475 | 80 | Yes(GA) | Comparative Example |
| 16 | 478 | 45 | No | Inventive Example |
| 17 | 420 | 60 | Yes(GA) | Inventive Example |
| 18 | 482 | 80 | Yes(GI) | Comparative Example |
| 19 | 478 | 45 | No | Inventive Example |
| 20 | 473 | 44 | Yes(GA) | Inventive Example |
| 21 | 482 | 45 | Yes(GI) | Comparative Example |
| 22 | 475 | 45 | Yes(GI) | Inventive Example |
| 23 | 471 | 43 | Yes(GA) | Inventive Example |
| 24 | 478 | 45 | Yes(GA) | Inventive Example |
| 25 | 479 | 45 | Yes(GA) | Comparative Example |
| 26 | 498 | 43 | Yes(GA) | Comparative Example |
| 27 | 483 | 44 | Yes(GA) | Comparative Example |
| 28 | 475 | 45 | Yes(GA) | Comparative Example |
| 29 | 475 | 45 | Yes(GA) | Comparative Example |
| 30 | 475 | 45 | Yes(GA) | Comparative Example |

Samples were taken from the steel sheets obtained as described above. Then structure identification, a tensile test in which a direction 90° with respect to the rolling direction (C direction) was used as a tensile direction, and a hole expansion test were performed using methods described below. Specifically, the following were measured: the area fraction of the ferrite phase; the area fraction of the martensite phase; the area fraction of a second phase other than the martensite ("Second phase other than M" in Table 3); the ratio of crystal grains with an average crystal grain diameter of less than 1.0 μm in the martensite phase ("M with d<1.0" in Table 3); the ratio of crystal grains with an average crystal grain diameter of 1.0 μm to 4.0 μm ("M with d=1.0 to 4.0" in Table 3); the ratio of crystal grains with an average crystal grain diameter of more than 4.0 μm (M with d>4.0); the ratio of crystal grains with a major axis of 1.0 μm to 3.0 μm in the crystal grains with an average crystal grain diameter of 1.0 μm to 4.0 μm ("M with major axis of 1.0 to 3.0 in M with d=1.0 to 4.0" in Table 3); and the ratio of crystal grains with a major axis of more than 3.0 μm in the crystal grains with an average crystal grain diameter of 1.0 μm to 4.0 μm (M with major axis>3.0 in M with d=1.0 to 4.0). In addition, the yield strength (YS), the tensile strength (TS), the total elongation (El), and the hole expansion ratio (λ) were measured.

(i) Structure Observation

A specimen for structure observation was taken from a steel sheet. An L cross section (a vertical cross section parallel to the rolling direction) was mechanically polished and etched with nital, and an image of the cross section was taken at a magnification of 3,000× using a scanning electron microscope (SEM). Using the structure photograph (SEM photograph) taken at a depth of ⅜ the thickness of the sheet from its surface, steel structure identification was performed, and the area fraction of the martensite phase, the area fraction of the ferrite phase, and the area fraction of the second phase other than the martensite were measured. The structure photograph was transferred onto a transparency. Then the transferred image was colored, captured, and binarized, and each of the area fractions was determined using image analysis software. As for the average grain diameter of each of the martensite crystal grains, the circle equivalent diameter of the crystal grain was calculated using its area and used as the average grain diameter. The major axis of each of the martensite crystal grains was determined using an SEM photograph taken at a magnification of 5,000× using the SEM. Specifically, a maximum length of each crystal grain was measured for at least 100 crystal grains, and the average length was defined as the major axis of the crystal grain.

The "Second phase other than M" in Table 2 means a phase other than ferrite and martensite and was found to include bainite. The area fraction of the bainite phase included in the "second phase other than M" was 90% or more. The area fraction of the bainite phase was determined using the colored portions obtained by the method described above. The bainite phase included in colored portions excluding the ferrite and martensite phases was identified, and the area fraction of the identified bainite phase was measured.

(ii) Tensile Properties

A JIS No. 5 tensile test specimen (JIS Z 2201) in which a direction 90° with respect to the rolling direction (C direction) was used as a tensile direction was taken from a steel sheet, and a tensile test was performed according to the specifications of JIS Z 2241 to measure the YS, TS, and El. The criterion (pass/fail criterion) of the tensile test was TS 780 MPa.

(iii) Stretch Flangeability

The stretch flangeability was evaluated using a hole expansion test according to The Japan Iron and Steel Federation Standard JFS T 1001. Specifically, a 100 mm×100 mm square sample was taken from one of the steel sheets obtained. A hole was punched in the sample using a punch with a diameter of 10 mm, and then the hole expansion test was performed using a conical punch with a vertex angle of 60° with the burrs located outside until a crack passing through the sheet occurred. In this case, the initial inner diameter (mm) of the hole was defined as d0, and the inner diameter (mm) of the hole when the crack occurred was defined as d. Then a hole expansion ratio λ (%)={(d−d0)/d0}×100 was determined. In the present invention, the punchability was judged as good when the following criteria were satisfied: Δλ defined below is 10 or less. λ/aveλ$_{5-20}$ defined below is from 0.90 to 1.20 inclusive.

Δλ

Δλ represents the difference between the maximum and minimum of the λ values evaluated when punching was performed with the punching clearance falling within the range of 5 to 20%. For simplicity, the difference between the maximum and minimum among three values including λ measured according to The Japan Iron and Steel Federation Standard JFS T 1001 and λ values (λ$_5$ and λ$_{20}$) measured with target clearances set to 5% and 20% may be used as a substitute for the above difference. A value obtained with the clearance deviating by up to ±1% from a target clearance may be used for the evaluation.

λ/aveλ$_{5-20}$

λ/aveλ$_{5-20}$ represents a value obtained by dividing the λ measured according to The Japan Iron and Steel Federation Standard JFS T 1001 by the average of λ values evaluated when punching was performed with the punching clearance falling within the range of 5% to 20%. For simplicity, a value obtained by division by the average of three values including the λ measured according to The Japan Iron and Steel Federation Standard JFS T 1001 and the λ values (λ$_5$ and λ$_{20}$) measured with target clearances set to 5% and 20% may be used as a substitute for the above value. A value obtained with the clearance deviating by up to ±1% from a target clearance may be used for the evaluation.

The results obtained are shown in Table 3.

TABLE 3

| | | Microstructure of steel sheet | | | | | | | Mechanical properties | |
| --- | --- | --- | --- | --- | --- | --- | --- | --- | --- | --- |
| Steel sheet | Steel | Ferrite (%) | Martensite (%) | Second phase other than M | M with d < 1.0 (%) | M with d = 1.0 to 4.0 (%) | M with d > 4.0 (%) | M with major axis of 1.0 to 3.0 in M with d = 1.0 to 4.0 (%) | M with major axis > 3.0 in M with d = 1.0 to 4.0 | YS (MPa) | TS (MPa) |
| 1 | A | 30 | 35 | 35 | 10 | 88 | 2 | 10 | 90 | 504 | 824 |
| 2 | | 64 | 15 | 21 | 8 | 90 | 2 | 5 | 95 | 468 | 754 |

TABLE 3-continued

| No | Steel | | | | | | | | | | |
|---|---|---|---|---|---|---|---|---|---|---|---|
| 3 |   | 42 | 25 | 33 | 9 | 89 | 2 | 8 | 92 | 508 | 811 |
| 4 |   | 43 | 26 | 31 | 7 | 90 | 3 | 23 | 77 | 495 | 806 |
| 5 |   | 31 | 33 | 36 | 2 | 69 | 29 | 45 | 55 | 503 | 819 |
| 6 |   | 40 | 19 | 41 | 9 | 83 | 8 | 7 | 93 | 465 | 730 |
| 7 |   | 34 | 45 | 21 | 3 | 79 | 18 | 35 | 65 | 511 | 832 |
| 8 |   | 37 | 40 | 23 | 4 | 92 | 4 | 32 | 68 | 495 | 808 |
| 9 | B | 45 | 26 | 29 | 12 | 85 | 3 | 12 | 88 | 524 | 826 |
| 10 |   | 53 | 25 | 22 | 10 | 88 | 2 | 15 | 85 | 508 | 809 |
| 11 |   | 43 | 53 | 4 | 8 | 79 | 13 | 30 | 70 | 519 | 859 |
| 12 |   | 35 | 38 | 27 | 1 | 38 | 61 | 72 | 28 | 530 | 873 |
| 13 |   | 55 | 23 | 22 | 6 | 84 | 10 | 17 | 83 | 521 | 810 |
| 14 |   | 56 | 25 | 19 | 4 | 88 | 8 | 15 | 85 | 502 | 831 |
| 15 |   | 35 | 40 | 25 | 1 | 24 | 75 | 87 | 13 | 554 | 901 |
| 16 | C | 20 | 40 | 40 | 14 | 85 | 1 | 14 | 86 | 501 | 811 |
| 17 |   | 23 | 33 | 44 | 12 | 86 | 2 | 17 | 83 | 491 | 792 |
| 18 |   | 18 | 47 | 35 | 2 | 57 | 41 | 89 | 11 | 620 | 1013 |
| 19 | D | 48 | 28 | 24 | 13 | 84 | 3 | 11 | 89 | 506 | 826 |
| 20 |   | 45 | 32 | 23 | 14 | 82 | 4 | 13 | 87 | 522 | 841 |
| 21 |   | 41 | 33 | 26 | 4 | 73 | 23 | 35 | 65 | 536 | 852 |
| 22 | E | 33 | 32 | 35 | 11 | 86 | 3 | 13 | 87 | 512 | 831 |
| 23 | F | 32 | 35 | 33 | 8 | 90 | 2 | 9 | 91 | 532 | 867 |
| 24 | G | 22 | 36 | 42 | 9 | 89 | 2 | 15 | 85 | 594 | 958 |
| 25 | H | 56 | 28 | 16 | 5 | 84 | 11 | 35 | 65 | 375 | 615 |
| 26 | I | 67 | 22 | 11 | 4 | 88 | 8 | 51 | 49 | 501 | 826 |
| 27 | J | 65 | 25 | 10 | 6 | 81 | 13 | 40 | 60 | 414 | 675 |
| 28 | K | 76 | 24 | 0 | 1 | 84 | 15 | 16 | 84 | 541 | 892 |
| 29 | A | 31 | 35 | 34 | 7 | 87 | 6 | 31 | 69 | 500 | 818 |
| 30 |   | 30 | 34 | 36 | 3 | 85 | 12 | 38 | 62 | 497 | 816 |

| | Mechanical properties | | | | | | | |
|---|---|---|---|---|---|---|---|---|
| Steel sheet | YR(%) | EL(%) | $\lambda$(%) | $\lambda 5$ | $\lambda 20$ | $\Delta\lambda$ ($\lambda$max − $\lambda$min) | $\lambda$/ (ave$\lambda_{5\text{-}20}$) | Remarks |
| 1 | 61.2 | 18.2 | 33 | 27 | 29 | 6 | 1.11 | Inventive Example |
| 2 | 62.1 | 19.2 | 35 | 22 | 32 | 13 | 1.18 | Comparative Example |
| 3 | 62.6 | 18.4 | 32 | 26 | 29 | 6 | 1.10 | Inventive Example |
| 4 | 61.4 | 18.7 | 31 | 21 | 26 | 10 | 1.19 | Inventive Example |
| 5 | 61.4 | 18.0 | 26 | 20 | 18 | 8 | 1.22 | Comparative Example |
| 6 | 63.7 | 18.5 | 29 | 19 | 22 | 10 | 1.24 | Comparative Example |
| 7 | 61.4 | 17.4 | 33 | 21 | 25 | 12 | 1.25 | Comparative Example |
| 8 | 61.3 | 17.9 | 33 | 24 | 23 | 10 | 1.24 | Comparative Example |
| 9 | 63.4 | 17.8 | 36 | 29 | 32 | 7 | 1.11 | Inventive Example |
| 10 | 62.8 | 18.1 | 35 | 29 | 31 | 6 | 1.11 | Inventive Example |
| 11 | 60.4 | 17.5 | 23 | 12 | 22 | 11 | 1.21 | Comparative Example |
| 12 | 60.7 | 16.3 | 29 | 17 | 26 | 12 | 1.21 | Comparative Example |
| 13 | 64.3 | 17.8 | 34 | 21 | 25 | 13 | 1.28 | Comparative Example |
| 14 | 60.4 | 17.3 | 29 | 17 | 24 | 12 | 1.24 | Comparative Example |
| 15 | 61.5 | 15.8 | 28 | 16 | 25 | 12 | 1.22 | Comparative Example |
| 16 | 61.8 | 18.2 | 36 | 30 | 29 | 7 | 1.14 | Inventive Example |
| 17 | 62.0 | 18.3 | 42 | 34 | 39 | 8 | 1.10 | Inventive Example |
| 18 | 61.2 | 14.2 | 19 | 12 | 15 | 7 | 1.24 | Comparative Example |
| 19 | 61.3 | 18.1 | 38 | 34 | 32 | 6 | 1.10 | Inventive Example |
| 20 | 62.1 | 17.7 | 32 | 28 | 26 | 6 | 1.12 | Inventive Example |
| 21 | 62.9 | 16.6 | 27 | 17 | 22 | 10 | 1.23 | Comparative Example |
| 22 | 61.6 | 18.1 | 28 | 26 | 22 | 6 | 1.11 | Inventive Example |
| 23 | 61.4 | 17.2 | 30 | 25 | 28 | 5 | 1.08 | Inventive Example |
| 24 | 62.0 | 15.5 | 25 | 22 | 22 | 3 | 1.09 | Inventive Example |
| 25 | 61.0 | 23.2 | 47 | 34 | 44 | 13 | 1.13 | Comparative Example |
| 26 | 60.7 | 17.4 | 32 | 22 | 25 | 10 | 1.22 | Comparative Example |
| 27 | 61.3 | 21.4 | 25 | 13 | 24 | 12 | 1.21 | Comparative Example |
| 28 | 60.7 | 16.8 | 20 | 12 | 17 | 8 | 1.22 | Comparative Example |
| 29 | 61.1 | 18.5 | 35 | 20 | 30 | 15 | 1.24 | Comparative Example |
| 30 | 60.9 | 18.6 | 34 | 18 | 20 | 16 | 1.42 | Comparative Example |

As can be seen from Table 3, steel sheets Nos. 1, 3, 4, 9, 10, 16, 17, 19, 20, and 22 to 24 are Inventive Examples in which their chemical composition and production method conform to the present invention. These steel sheets satisfy TS 780 MPa or more. In these steel sheets, $\Delta\lambda$, which is an indicator of the punchability, is 10 or less, and $\lambda/\text{ave}\lambda_{5\text{-}20}$ is 0.90 to 1.20. Therefore, in these steel sheets, the formability of punched edge faces is good.

However, in Nos. 2, 5 to 8, 11 to 15, 18, 21, and 25 to 30, which are Comparative Examples, their components are outside the range of the present invention, or the production conditions do not conform to the present invention. Therefore, the desired microstructure is not obtained, and the desired properties are not obtained. When both $\Delta\lambda$ and $\lambda/\text{ave}\lambda_{5\text{-}20}$ do not meet the specifications, in particular when $\lambda/\text{ave}\lambda_{5\text{-}20}$ exceeds 1.20, it is difficult to stably ensure the formability of punched edge faces. In this case, when automobile structural components are produced using an actual press, the rate of occurrence of troubles such as press cracking is high.

INDUSTRIAL APPLICABILITY

According to the present invention, a high-strength steel sheet having a tensile strength of 780 MPa or more and excellent in punchability can be obtained. The high-strength steel sheet is applicable to difficult-to-form members such as automobile structural members to which conventional high-strength steel sheets are not easily applied. When the high-strength steel sheet of the invention is used for automobile structural members, the steel sheet contributes to a reduction in weight of the automobiles, an improvement in safety, etc. and is therefore very useful from the industrial point of view.

The invention claimed is:

1. A high-strength steel sheet having a tensile strength of 780 MPa or more and excellent in punchability, the high-strength steel sheet having a chemical composition comprising, in mass %,
C: from 0.07% to 0.15% inclusive,
Si: from 0.01% to 0.50% inclusive,
Mn: from 2.0% to 3.0% inclusive,
P: from 0.001% to 0.050% inclusive,
S: from 0.0005% to 0.010% inclusive,
sol. Al: from 0.005% to 0.100% inclusive,
N: from 0.0001% to 0.0060% inclusive,
Ti: from 0.01% to 0.10% inclusive, and
Nb: from 0.01% to 0.10% inclusive,
and optionally, at least one group selected from the group consisting of Group A and B,
Group A which contains at least one selected from Mo: from 0.05% to 1.00% inclusive, Cr: from 0.05% to 1.00% inclusive, V: from 0.02% to 0.50% inclusive, Zr: from 0.02% to 0.20% inclusive, B: from 0.0001% to 0.0030% inclusive, Cu: from 0.05% to 1.00% inclusive, and Ni: from 0.05% to 1.00% inclusive, and
Group B which contains at least one element selected from Ca: from 0.001% to 0.005% inclusive Sb: from 0.0030% to 0.0100% inclusive, and REM: from 0.001% to 0.005% inclusive,
with the balance being, Fe and unavoidable impurities,
wherein the high-strength steel sheet has a steel structure containing a ferrite phase, a martensite phase, and a bainite phase,
wherein an area fraction of the martensite phase is from 20% to 50% inclusive, and wherein the martensite phase includes:
crystal grains with an average crystal grain diameter of less than 1.0 μm at an area fraction of 5% to 30%,
crystal grains with an average crystal grain diameter of 1.0 μm to 4.0 μm at an area fraction of 70% to 95%, and
crystal grains with an average crystal grain diameter of more than 4.0 μm at an area fraction of less than 5%.

2. The high-strength steel sheet according to claim 1, wherein, in the martensite phase, the crystal grains with an average crystal grain diameter of 1.0 μm to 4.0 μm include crystal grains with a major axis of 1.0 μm to 3.0 μm at an area fraction of less than 20% and crystal grains with a major axis of more than 3.0 μm at an area fraction of 80% or more.

3. A method for producing the high-strength steel sheet according to claim 2, the method comprising subjecting a steel slab having said chemical composition to hot rolling, cold rolling, primary annealing, and secondary annealing,
wherein the primary annealing is performed at a primary annealing temperature of from an Ac3 point to the Ac3 point+60° C. inclusive for a primary annealing time of from 10 seconds to 200 seconds inclusive, the primary annealing time being a holding time at the primary annealing temperature,
wherein the secondary annealing is performed at an annealing temperature equal to or lower than the Ac3 point for a secondary annealing time of from 10 seconds to 100 seconds inclusive, the annealing temperature being (the primary annealing temperature-80° C.) to (the primary annealing temperature-30° C.), the secondary annealing time being a holding time at the secondary annealing temperature, and
wherein, in the secondary annealing, cooling is performed down to a cooling stop temperature of 400° C. to 550° C. such that a residence time during which the steel sheet is held at 400° C. to 550° C. is from 20 seconds to 100 seconds inclusive.

4. The method for producing the high-strength steel sheet according to claim 3, the method further comprising, after the secondary annealing, performing cooling and then performing galvanization.

5. The method for producing the high-strength steel sheet according to claim 4, the method further comprising, after the galvanization, performing an alloying treatment.

6. A method for producing the high-strength steel sheet according to claim 1, the method comprising subjecting a steel slab having the chemical composition according to claim 1 to hot rolling, cold rolling, primary annealing, and secondary annealing,
wherein the primary annealing is performed at a primary annealing temperature of from an Ac3 point to the Ac3 point+60° C. inclusive for a primary annealing time of from 10 seconds to 200 seconds inclusive, the primary, annealing time being a holding time at the primary annealing temperature,
wherein the secondary annealing is performed at an annealing temperature equal to or lower than the Ac3 point fora secondary annealing time of from 10 seconds, to 100 seconds, inclusive, the annealing temperature being (the primary annealing temperature—80° C.) to (the primary annealing temperature—30° C.), the secondary annealing time being a holding time at the secondary annealing, temperature, and
wherein in the secondary annealing, cooling is performed down to a cooling stop temperature of 400° C. to 550° C. such that a residence time during which the steel sheet is held at 400° C. to 550° C. is from 20 seconds to 100 seconds inclusive.

7. The method for producing the high-strength steel sheet according to claim 6, the method further comprising, after the secondary annealing, performing cooling and then performing: galvanization.

8. The method for producing the high-strength steel sheet according to claim 7, the method further comprising, after the galvanization, performing an alloying treatment.

* * * * *